(12) United States Patent
Srivastava et al.

(10) Patent No.: US 7,141,794 B2
(45) Date of Patent: Nov. 28, 2006

(54) SCINTILLATOR COMPOSITIONS, RELATED PROCESSES, AND ARTICLES OF MANUFACTURE

(75) Inventors: Alok Mani Srivastava, Niskayuna, NY (US); Steven Jude Duclos, Clifton Park, NY (US); Holly Ann Comanzo, Niskayuna, NY (US); Venkat Subramaniam Venkataramani, Clifton Park, NY (US); Venkatesan Manivannan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 210 days.

(21) Appl. No.: 10/881,956

(22) Filed: Jun. 28, 2004

(65) Prior Publication Data
US 2005/0285041 A1    Dec. 29, 2005

(51) Int. Cl.
*G01T 1/20* (2006.01)
(52) U.S. Cl. ................................. 250/361 R
(58) Field of Classification Search ............ 250/361 R
See application file for complete search history.

(56) References Cited

U.S. PATENT DOCUMENTS

| | | | |
|---|---|---|---|
| 5,869,836 A | 2/1999 | Linden et al. | |
| 6,583,434 B1* | 6/2003 | Struye et al. | 250/581 |
| 6,585,913 B1 | 7/2003 | Lyons et al. | |
| 6,624,422 B1 | 9/2003 | Williams et al. | |

2001/0053017 A1* 12/2001 Oyama ........................ 359/350

OTHER PUBLICATIONS

A.V. Gektin, "Scintillators and storage phosphors based on ABX$_3$ crystals", Journal of Luminescence, 87-89, pp. 1283-1285, 2000.
O.T. Antonyak, et al "Study of Features of Excitation of Ce$^{3+}$ Ions in Perovskite Halide Crystals", Optics and Spectroscopy, vol. 84, No. 6, pp. 861-864, 1998.
A.V. Gektin, et al High temperature thermoluminescence of KMgF$_3$—based crystals, Journal of Luminescence, 72-74 pp. 664-666, 1997.
A.S. Voloshinovskh, et al "Peculiarities of Excitation of Ce-Emission in core region of Chlorine Perovskites", Radiation Measurements, vol. 29, No. 3-4, pp. 251-255, 1998.
G. Blasse, et al, "Luminescent Materials", X-Ray Phospors and Scintillators (Counting Techniques), Springer-Verlag, Berlin, Heidelberg, New York, London, Paris, Tokyo, Hong, Kong, Barcelona, Budapest, pp. 178-194, no date.
JC Brice, et al, "Crystal Growth Processes", Blackie Glasgow and London Halsted Press, a Division of John Wiley and Sons, pp. 104-162, no date.

* cited by examiner

*Primary Examiner*—Constantine Hannaher
(74) *Attorney, Agent, or Firm*—Francis T. Coppa; Patrick K. Patnode

(57) ABSTRACT

A scintillator composition of a halide perovskite material of at least one ABX$_3$ type halide perovskite, at least one activator for the matrix material and optionally at least one charge compensator to assist the incorporation of the activator in the perovskite lattice and any reaction products thereof. Radiation detectors that use the scintillators are also described, as are related methods for detecting high-energy radiation and method of producing an activated halide-perovskite based scintillator crystal.

42 Claims, 6 Drawing Sheets

SCINTILLATOR COMPOSITIONS, RELATED PROCESSES, AND ARTICLES OF MANUFACTURE

BACKGROUND

The invention relates generally to materials and devices used in the detection of ionizing radiation. More specifically, it relates to scintillator compositions, which are especially useful for detecting gamma-rays and X-rays under a variety of conditions.

Many techniques are available for detecting high-energy radiation. Scintillators are of special interest, in view of their simplicity and accuracy. Thus, scintillator crystals are widely used in detectors for gamma-rays, X-rays, cosmic rays, and particles characterized by an energy level of greater than about 1 keV. From such crystals, it is possible to manufacture detectors, in which the crystal is coupled with a light-detection means, i.e., a photodetector. When photons from a radionuclide source impact the crystal, the crystal emits light. The photodetector produces an electrical signal proportional to the number of light pulses received, and to their intensity. Scintillator crystals are in common use for many applications. Examples include medical imaging equipment, e.g., positron emission tomography (PET) devices; well-logging for the oil and gas industry, and various digital imaging applications.

Scintillators are designed to be responsive to X-ray and gamma ray excitation. Moreover, it is desirable that scintillators possess a number of characteristics which enhance radiation detection. For example, scintillator materials desirably possess high light output, short decay time, high "stopping power", and acceptable energy resolution.

Commonly used scintillator materials include thallium-activated sodium iodide (NaI(Tl)), bismuth germanate (BGO), cerium-doped gadolinium orthosilicate (GSO), and cerium-doped lutetium orthosilicate (LSO). Although, each of these materials has some good properties which are suitable for certain applications, they possess one or more deficiencies, along with their attributes. Deficiencies may include low light conversion, slow decay time, an emission spectrum not spectrally matched to the photodetector, large temperature dependency of sensitivity, low x-ray or gamma-ray stopping power, or absorption of oxygen and moisture leading to persistent afterglow and high background rate due to radioactive isotope of component elements.

New scintillator materials that exhibit excellent light output, as well as relatively fast decay times are therefore desirable. They should also desirably possess good energy resolution characteristics, especially in the case of gamma rays. Moreover, new scintillators should desirably be readily transformable into single crystalline materials or other transparent solid bodies. Furthermore, they should desirably be capable of being produced efficiently, at reasonable cost and acceptable crystal size. The scintillators should also desirably be compatible with a variety of high-energy radiation detectors.

BRIEF DESCRIPTION

One aspect of the present invention provides a scintillator composition comprising an $ABX_3$ type halide perovskite material, wherein A is sodium, potassium, rubidium or cesium, B is calcium, strontium, barium, magnesium, cadmium or zinc, with the proviso that X is bromine or iodine, when B is calcium, strontium, barium, or magnesium, and X is fluorine, chlorine, bromine or iodine, when B is cadmium or zinc, and at least one activator for the perovskite material and any reaction products thereof.

Another embodiment of the present invention provides a scintillator composition comprising an $ABX_3$ type halide perovskite matrix material, wherein A is sodium, potassium, rubidium or cesium; B is calcium, strontium, barium, magnesium, cadmium or zinc, and X is fluorine, chlorine, bromine, or iodine, at least one activator for the perovskite material and at least one charge compensator to assist the incorporation of the activator in the perovskite lattice, and any reaction products thereof.

Another embodiment of the present invention provides a scintillator composition comprising a perovskite material consisting of a solid solution of at least two $ABX_3$ type halide perovskites; wherein A is independently sodium, potassium, rubidium or cesium; B is independently calcium, strontium, barium, magnesium, cadmium or zinc, and X is independently fluorine, chlorine, bromine, or iodine, at least one activator for the perovskite material, and, optionally, a charge compensator to assist the incorporation of the activator in the perovskite lattice, and any reaction products thereof.

Another aspect of the invention is a high-energy radiation detector having a halide perovskite based scintillator composition. Another aspect of the invention is a method for detecting high-energy radiation with a scintillation detector having a halide perovskite based scintillator composition. A further aspect provides a method for producing halide perovskite based scintillator crystals. The method includes the growth of a single crystal from a molten mixture of the scintillator composition.

DRAWINGS

These and other features, aspects, and advantages of the present invention will become better understood when the following detailed description is read with reference to the accompanying drawings in which like characters represent like parts throughout the drawings, wherein:

FIG. 1 graphically shows the emission spectrum for a scintillator composition sample A under X-ray excitation.

FIG. 2 graphically shows the emission spectrum for a scintillator composition sample B under X-ray excitation.

FIG. 3 graphically shows the emission spectrum for a scintillator composition sample C under X-ray excitation.

FIG. 4 graphically shows the emission spectrum for a scintillator composition sample D under X-ray excitation.

FIG. 5 graphically shows the emission spectrum for a scintillator composition sample E under X-ray excitation.

FIG. 6 graphically shows the emission spectrum for a scintillator composition sample G under X-ray excitation.

FIG. 7 graphically shows the emission spectrum for a scintillator composition sample H under X-ray excitation.

DETAILED DESCRIPTION

Figure 1:
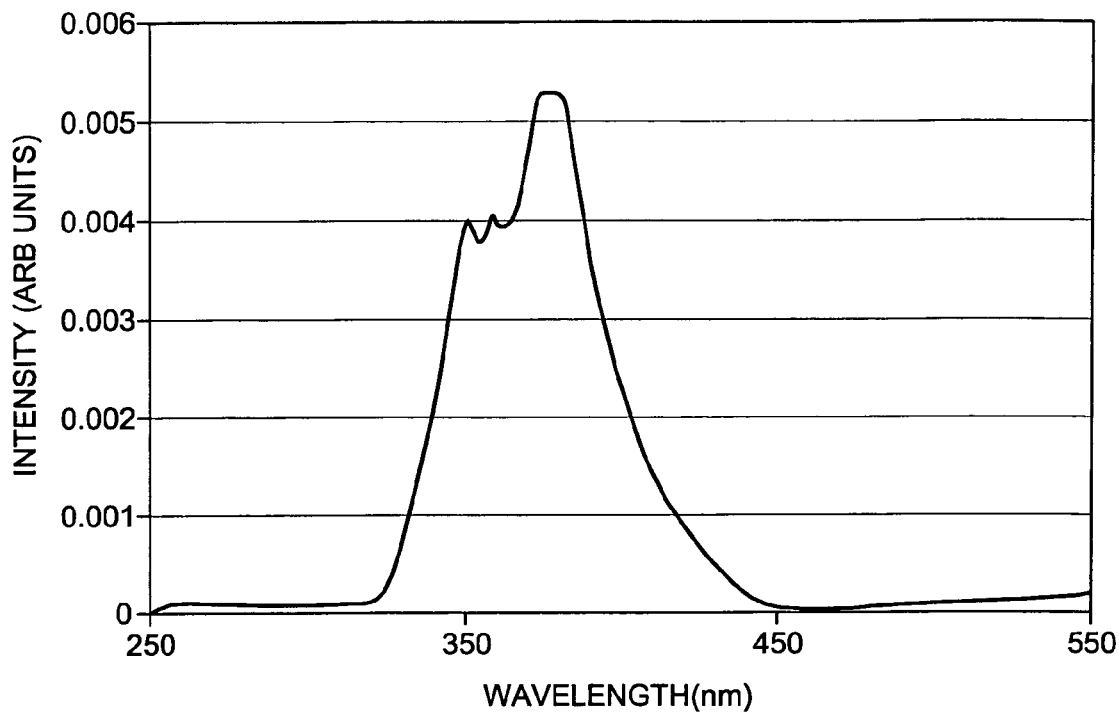

As used herein, the term, "light output" is the quantity of visible light emitted by the scintillator after being excited by a pulse of the x-ray or gamma ray. High light output is desirable because it enhances the radiation detector's ability to convert the light into an electric pulse.

The term "decay time" refers to the time required for the intensity of the light emitted by the scintillator to decrease to a specified fraction of the light intensity at the time when the radiation excitation ceases. For many applications, such as the PET devices, shorter decay times are desirable because they allow efficient coincidence-counting of gamma rays. Consequently, scan times are reduced, and images can be improved by eliminating random counts due to accidental coincidences.

"Stopping power" is the ability of a material to absorb radiation, and is sometimes referred to as the material's "X-ray absorption" or "X-ray attenuation". Stopping power is directly related to the density of the scintillator material. Scintillator materials which have high stopping power allow little or no radiation to pass through, and this is a distinct advantage in efficiently capturing the radiation.

The "energy resolution" of a radiation detector refers to its ability to distinguish between energy rays (e.g., gamma rays) having very similar energy levels. Energy resolution is usually reported as a percentage value, after measurements are taken at a standard radiation emission energy for a given energy source. Lower energy resolution values are very desirable, because they usually result in a higher quality radiation detector.

In one embodiment of the scintillator composition of the present invention, A is cesium, rubidium, potassium, or sodium, B is calcium, strontium, barium, magnesium, cadmium or zinc, with the proviso that X is bromine, or iodine, when B is calcium, strontium, barium, or magnesium, and X is fluorine, chlorine, bromine or iodine, when B is cadmium or zinc. The activator used in this embodiment is at least one of trivalent cerium ions or praseodymium ions.

In another embodiment of the scintillator composition, A is cesium, rubidium, potassium, or sodium, B is calcium, strontium, barium, magnesium, cadmium or zinc, and X, halide is fluorine, chlorine, bromine, or iodine. The activator used in this embodiment is trivalent cerium or praseodymium or both. In this embodiment a charge compensator assists in the incorporation of the activator in the perovskite lattice. For example, when trivalent cerium is used as the activator, charge compensation may be achieved by using at least one of monovalent sodium ions or lithium ions.

In another embodiment of the scintillator composition, the matrix material is in the form of a solid solution of at least two halide-perovskites. As used herein, the term "solid solution" refers to a mixture of the halide perovskites in solid, crystalline form, which may include a single phase, or multiple phases. (Those skilled in the art understand that phase transitions may occur within a crystal after it's formation, e.g., after subsequent processing steps like sintering or densification). In this embodiment A is independently cesium, rubidium, potassium, or sodium, B is independently calcium, strontium, barium, magnesium, cadmium or zinc, and X, is independently fluorine, bromine, or iodine. In this embodiment an optional charge compensator is useful for assisting in the incorporation of the activator in the perovskite lattice. For example, when at least one of trivalent cerium or praseodymium is used as the activator, charge compensation is typically achieved by using at least one of monovalent sodium or lithium ions.

In some embodiments the solid solution is based on a mixture of a first halide perovskite and a second halide perovskite. In that instance, the ratio of the two compounds may vary considerably, i.e., a molar ratio in the range of about 1:99 to about 99:1. Often, the molar ratio of the first halide perovskite to the second halide perovskite is in the range of about 10:90 to about 90:10. Very often, the molar ratio of the first halide perovskite to the second halide perovskite is in the range of about 30:70 to about 70:30. The specific ratio of the two compounds will depend on various factors, such as the desired properties mentioned above, e.g., light output and energy resolution.

The scintillator composition of the present invention includes an activator for the halide perovskite material. (The activator is sometimes referred to as a "dopant"). These activators provide the desired luminescence to the scintillator. The activator can be cerium, praseodymium, or mixtures of cerium and praseodymium. Cerium is a particularly good activator in this invention, because it imparts high luminescence efficiency and short decay time to the scintillator composition of the present invention. The activator is usually employed in its trivalent form, for example $Ce^{3+}$, $Pr^{3+}$, and is supplied in various forms, e.g., halides, such as cerium chloride or cerium bromide.

The amount of activator present will depend on various factors, such halide perovskite material being used; the desired emission properties and decay time; and the type of detection device into which the scintillator is being incorporated. Usually, the activator is employed at a level in the range of about 0.1 mole % to about 20 mole %, based on total moles of halide-perovskite material, activator and charge compensator, if present. In many embodiments, the amount of activator is in the range of about 1 mole % to about 10 mole %.

When the activator, for example trivalent cerium, is incorporated into the $ABX_3$ perovskite lattice, it takes the place of the divalent species B in the lattice. Charge compensation occurs by creation of defects and vacancies. This could lead to reduction in the luminescence efficiency of the composition. A charge compensator is incorporated along with the activator into the lattice to help increase the efficiency by avoiding creation of defects and vacancies. For a halide perovskite with at least one of trivalent cerium or praseodymium ions as activator, charge-compensator used is at least one of monovalent sodium or lithium ions. For example, two divalent B ions are replaced with one trivalent cerium ion and one monovalent sodium ion. Charge-compensator $Na^+$ thereby assists in the incorporation of the activator $Ce^{3+}$ in the perovskite lattice.

The selection of the charge compensator depends on the halide perovskite material and the activator used. The charge compensator is present in the scintillator composition at a level comparable to the level of the activator. Conveniently, equimolar amounts of the activator and charge compensator are incorporated into the lattice.

The composition of this invention may be prepared in several different forms. In some particularly good embodiments, the composition is in monocrystalline (i.e., "single crystal") form. Monocrystalline scintillation crystals have a greater tendency for transparency. They are especially useful for high-energy radiation detectors, e.g., those used for gamma rays.

However, the composition can be in other forms as well, depending on its intended end use. For example, it can be in powder form. It can also be prepared in the form of a polycrystalline ceramic. It should also be understood that scintillator compositions might contain small amounts of impurities. These impurities usually originate with the starting materials, and typically constitute less than about 0.1% by weight of the scintillator composition. Very often, they constitute less than about 0.01% by weight of the composition. To a large extent impurities are prevented by going for high purity precursor materials. The composition may also include parasite phases, whose volume percentage is usually less than about 1%. Moreover, minor amounts of other materials may be purposefully included in the scintillator compositions to achieve desired properties, as taught in commonly assigned U.S. Pat. No. 6,585,913 (Lyons et al).

Methods for preparing scintillator materials are generally known in the art. The mixing of reactants can be carried out by any suitable means, which ensures thorough, uniform blending. The materials can be synthesized in powder (polycrystalline) form by conventional solid state reaction technique. In this technique a mixture of solid starting materials is heated to a predetermined temperature and time. Since the starting materials are hygroscopic, mixing should be carried out in inert atmosphere (glove bag) to avoid exposure to air. The volatility of alkali halides at high temperatures requires a slight excess of these starting materials in the initial blend to compensate for their volatility. The mixture can also contain various additives, such as fluxing compounds and binders. Depending on compatibility and/or solubility and the method of milling, fluids such as alkanes, alkenes, ketones and alcohol (e.g. heptane, acetone, or ethyl alcohol) can be used as milling aids. Suitable milling media should be used, e.g., material that would not be contaminating to the scintillator, since such contamination could reduce its light-emitting capability.

After being blended, the mixture is fired under temperature and time conditions sufficient to convert the mixture into a solid solution. These conditions will depend in part on the specific type of matrix material and activator being used. Usually, firing will be carried out in a furnace, at a temperature in the range of about 500° C. to about 900° C. A desirable range is about 600° C. to about 800° C. The firing time will typically range from about 15 minutes to about 10 hours.

Firing may be carried out in an inert gas, such as nitrogen, helium, neon, argon, krypton, and xenon. After firing is complete, the resulting material can be pulverized, to put the scintillator into powder form. Conventional techniques can then be used to process the powder into radiation detector elements.

Methods for making single crystal materials are also well-known in the art. A non-limiting, exemplary reference is "Luminescent Materials", by G. Blasse et al, Springer-Verlag (1994). Usually, the appropriate reactants are melted at a temperature sufficient to form a congruent, molten composition. The melting temperature will depend on the identity of the reactants themselves, but is usually in the range of about 650° C. to about 1050° C.

In most embodiments where a single crystal is desired, the crystal is formed from the molten composition by a suitable technique. A variety of techniques can be employed. They are described in many references, such as "Crystal Growth Processes", by J. C. Brice, Blackie & Son Ltd (1986). Non-limiting examples of the crystal-growing techniques are the Bridgman-Stockbarger method; the Czochralski method, the zone-melting method (or "floating zone" method), and the temperature gradient method. Those skilled in the art will be familiar with the necessary details regarding each of these processes.

One non-limiting illustration can be provided for producing a scintillator in single crystal form, based in part on the teachings of the Lyons et al patent mentioned above. In this method, a seed crystal of the desired composition (described above) is introduced into a saturated solution. The solution is contained in a suitable crucible, and contains appropriate precursors for the scintillator material. The new crystalline material is allowed to grow and add to the single crystal, using one of the growing techniques mentioned above. The size of the crystal will depend in part on its desired end use, e.g., the type of radiation detector in which it will be incorporated.

Figure 14:
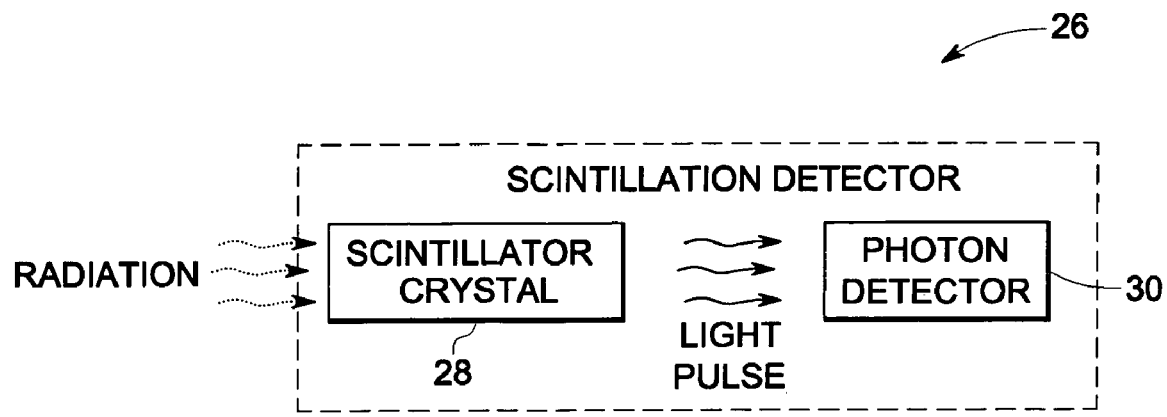
FIG. 14 is a simplified representation of a scintillation detector according to embodiments of the present invention.

Yet another embodiment of the invention is directed to a method for detecting high-energy radiation with a scintillation detector (26), as shown in FIG. 14. Scintillation detectors are well-known in the art, and need not be described in detail here. Briefly, the detector includes one or more crystals (28), formed from the scintillator composition described herein. The detector further includes one or more photodetectors (30). Non-limiting examples of photodetectors include photomultiplier tubes, photodiodes, CCD sensors, and image intensifiers. Choice of a particular photodetector will depend in part on the type of radiation detector being fabricated, and on its intended use.

Figure 8:
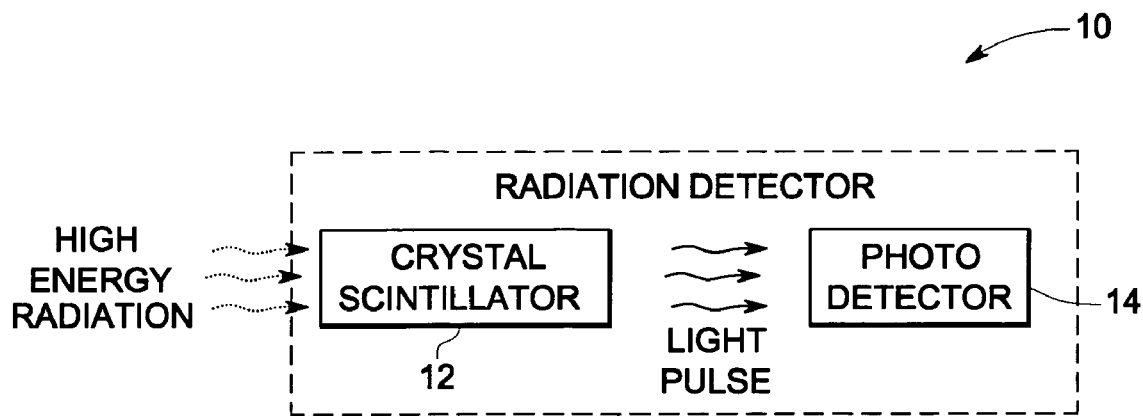
FIG. 8 is a simplified representation of a radiation detector according to embodiments of the present invention.
Figure 9:
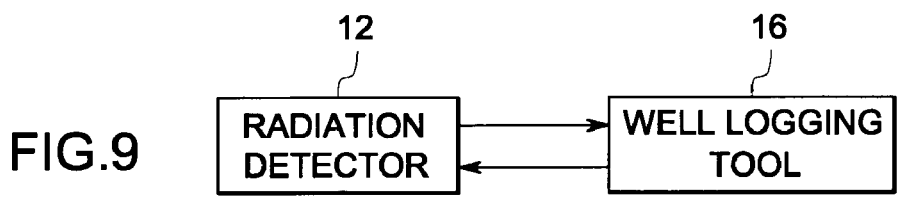
FIG. 9 is a simplified representation of a radiation detector operably coupled to a well logging tool according to embodiments of the present invention.
Figure 10:
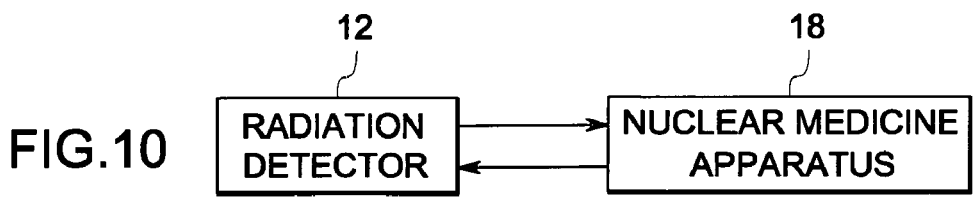
FIG. 10 is a simplified representation of a radiation detector operably coupled to a nuclear medicine apparatus according to embodiments of the present invention.
Figure 12:
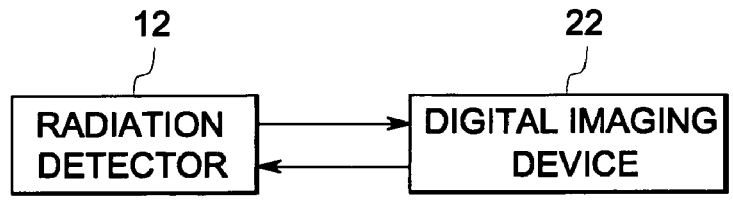
- FIG. 12 is a simplified representation of a radiation detector operably coupled to a digital imaging device according to embodiments of the present invention.
Figure 13:
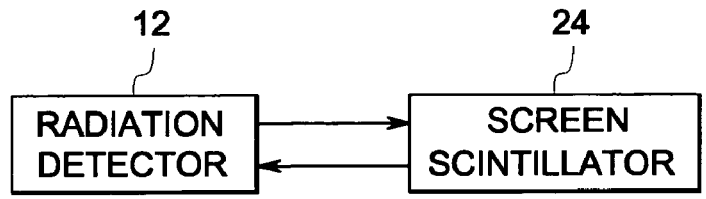
FIG. 13 is a simplified representation of a radiation detector operably coupled to a screen scintillator according to embodiments of the present invention.

The radiation detectors (10) themselves, as shown in FIG. 8, which include the scintillator (12) and the photodetector (14), can be connected to a variety of tools and devices, as mentioned previously. Non-limiting examples are shown in FIGS. 9 and 10 and include well-logging tools (16) and nuclear medicine devices (18) (e.g., PET). The radiation detectors may also be connected to digital imaging equipment, (22) e.g., pixilated flat panel devices (as depicted in FIG. 12). Moreover, the scintillator may serve as a component of a screen scintillator (24), as shown in FIG. 13. For example, powdered scintillator material could be formed into a relatively flat plate, which is attached to a film, e.g., photographic film. High-energy radiation, e.g., X-rays, originating from some source, would contact the scintillator and be converted into light photons, which are developed on the film.

Well-logging devices (16) were mentioned previously, and represent an important application for these radiation detectors (12). The technology for operably connecting the radiation detector to a well-logging tube is well-known in the art. The general concepts are described in many references including U.S. Pat. No. 5,869,836 (Linden et al). The crystal package containing the scintillator usually includes an optical window at one end of the enclosure-casing. The window permits radiation-induced scintillation light to pass out of the crystal package for measurement by the light-sensing device (e.g., the photomultiplier tube), which is coupled to the package. The light-sensing device converts the light photons emitted from the crystal into electrical pulses that are shaped and digitized by the associated electronics. By this general process, gamma rays can be detected, which in turn provides an analysis of the rock strata surrounding the drilling bore holes.

Figure 11:
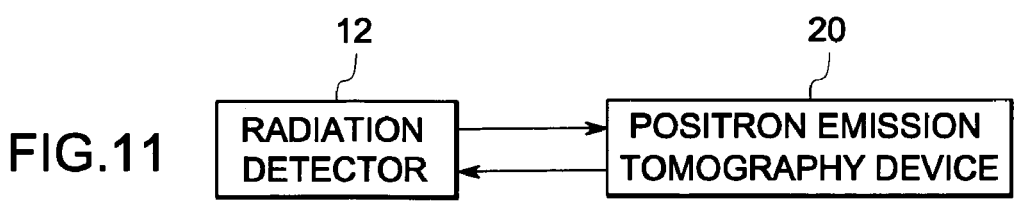
FIG. 11 is a simplified representation of a radiation detector operably coupled to a positron emlision tomography device according to embodiments of the present inven

Medical imaging equipment, such as the PET devices (20) mentioned above, represent another important application for these radiation detectors (22), as depicted in FIGS. 11 and 12. The technology for operably connecting the radiation detector (containing the scintillator) to a PET device is also well known in the art, e.g. U.S. Pat. No. 6,624,422. In brief, a radiopharmaceutical is usually injected into a patient, and becomes concentrated within an organ of interest. Radionuclides from the compound decay and emit positrons. When the positrons encounter electrons, they are annihilated and converted into photons, or gamma rays. The PET scanner can locate these "annihilations" in three dimensions, and thereby reconstruct the shape of the organ of interest for observation. The detector modules in the scanner usually include a number of "detector blocks", along with the associated circuitry. Each detector block may contain an array of the scintillator crystals, in a specified arrangement, along with photomultiplier tubes.

In both the well-logging and PET technologies, high light output of the scintillator is desirable. The present invention is expected to provide scintillator materials which can provide the desired light output for demanding applications of the technologies. Moreover, the crystals are also expected to simultaneously exhibit the other important properties noted above, e.g., short decay time, high "stopping power", and acceptable energy resolution. Furthermore, the scintillator materials are also expected to be manufactured economically, and also expected to be employed in a variety of other devices which require radiation detection.

EXAMPLES

The examples which follow are merely illustrative, and should not be construed to be any sort of limitation on the scope of the claimed invention. A number of scintillator samples were examined for their luminescence properties.

Sample A is cerium activated $CsSrCl_3$ ($CsSr_{0.98}Ce_{0.02}Cl_3$) The composition was prepared by dry mixing cerium chloride with cesium chloride and strontium chloride. (These materials are commercially available, or can be prepared by conventional techniques.) The volatility of the alkali halides at high temperatures requires a slight excess of these starting materials in the initial blend to compensate for their volatility. Mixing was carried out in an agate mortar and pestle. Since the starting materials are hygroscopic, mixing was carried out in inert atmosphere (glove box) to avoid exposure to air. The uniform mixture was transferred into a silver tube and sealed. The sample was then fired at a temperature of about 700° C. for about 7 hours. The heating atmosphere was nitrogen. Alternately, the samples can be fired in covered alumina crucibles under a slightly reducing atmosphere. The final composition obtained was $CsSr_{0.98}Ce_{0.02}Cl_3$. Starting material levels were adjusted to maintain the final molar ratio. FIG. 1. shows the emission spectrum of sample A under X-ray excitation having a peak energy of 60 keV.

Figure 2:
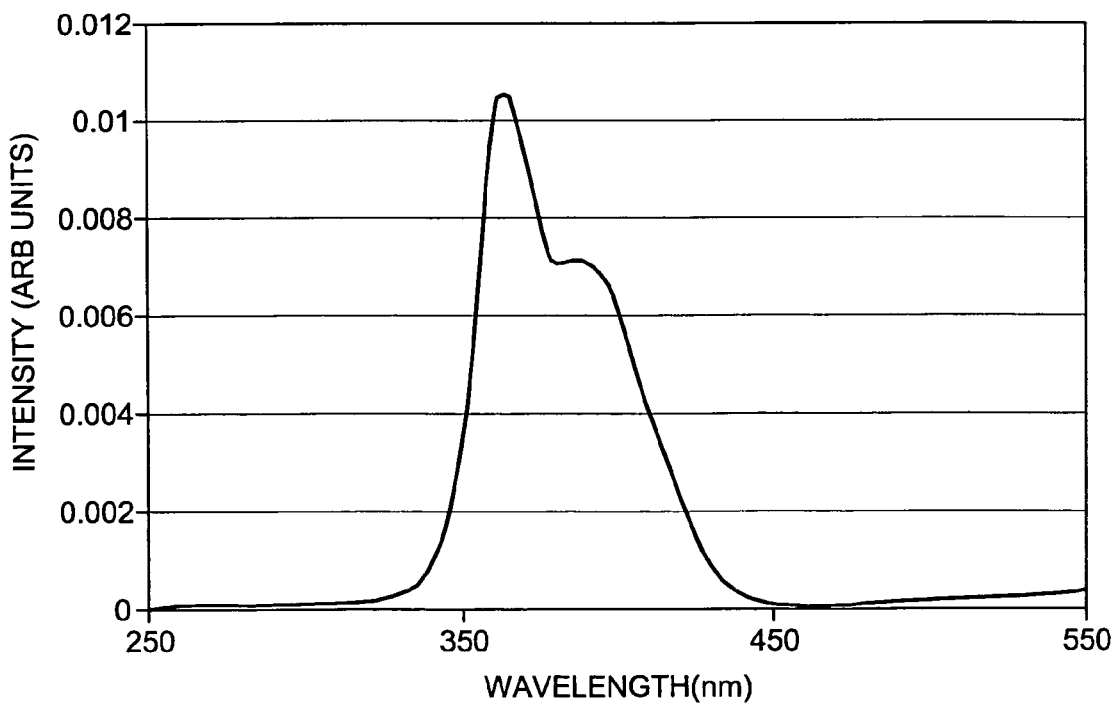

Sample B was a scintillator composition within the scope of the present invention. Sample B was cerium activated and charge compensated $CsSrCl_3$ ($CsSr_{0.96}Ce_{0.02}Na_{0.02}Cl_3$). The composition was prepared by dry mixing cerium chloride with cesium chloride, sodium chloride and strontium chloride. The levels of cerium (activator) containing reactant and the sodium (charge compensator) containing reactant are adjusted to obtain equimolar quantities of sodium and cerium in the final composition. The volatility of the alkali halides at high temperatures requires a slight excess of these starting materials in the initial blend to compensate for their volatility. Mixing was carried out in an agate mortar and pestle. Since the starting materials are hygroscopic, mixing was carried out in inert atmosphere (glove box) to avoid exposure to air. The uniform mixture was transferred into a silver tube and sealed. The sample was then fired at a temperature of about 700° C. The heating atmosphere was nitrogen. Alternately, the samples can be fired in covered alumina crucibles under a slightly reducing atmosphere. The final composition obtained was $CsSr_{0.96}Ce_{0.02}Na_{0.02}Cl_3$. Starting material levels are adjusted to maintain the final molar ratio. FIG. 2. shows the emission spectrum of sample B under X-ray excitation having a peak energy of 60 keV.

Figure 3:
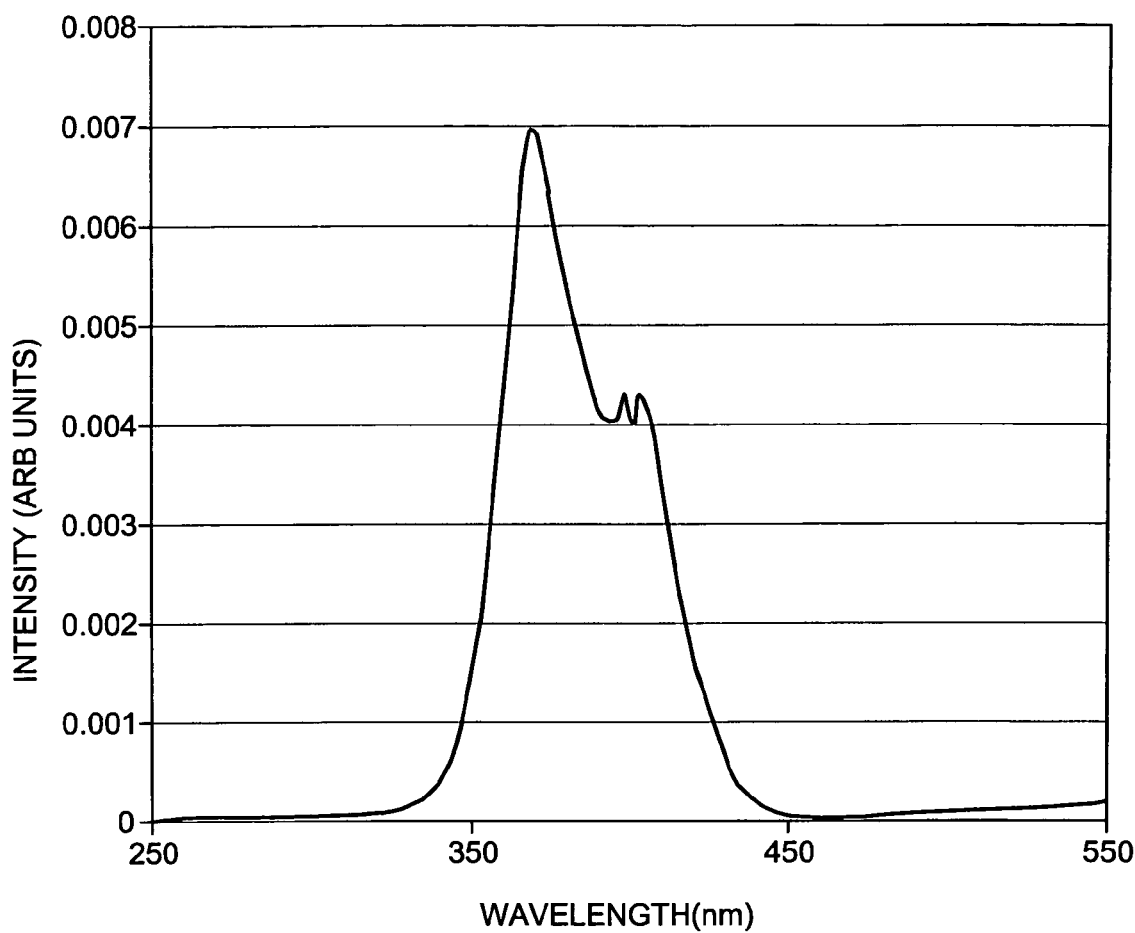

Sample C was another composition within the scope of the present invention. Sample C is cerium activated and charge compensated $CsCaCl_3$ ($CsCa_{0.96}Ce_{0.02}Na_{0.02}Cl_3$). The sample was prepared in the same manner as sample B, using a calcium containing reactant calcium chloride, instead of strontium chloride used to prepare sample B. The final composition obtained is $CsCa_{0.96}Ce_{0.02}Na_{0.02}Cl_3$. FIG. 3. shows the emission spectrum of sample C under X-ray excitation having a peak energy of 60 keV.

Figure 4:
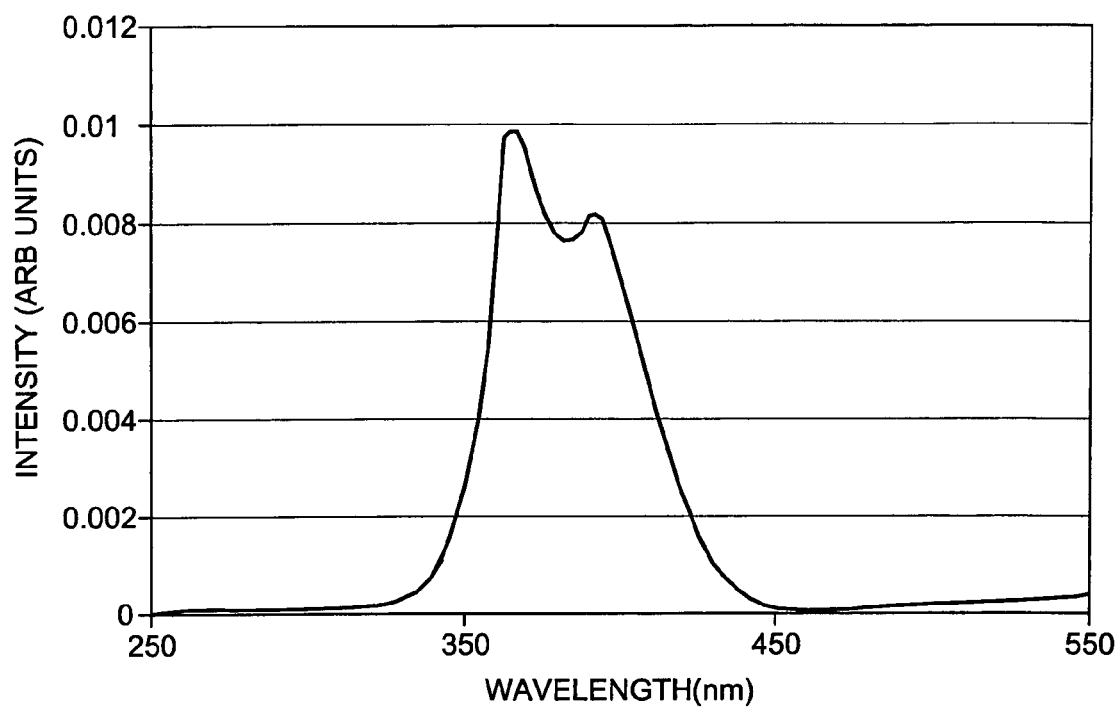

Sample D was another composition within the scope of the present invention. Sample D is cerium activated and charge compensated $RbCaCl_3$ ($RbCa_{0.96}Ce_{0.02}Na_{0.02}Cl_3$). The sample was prepared in the same manner as sample C, using a rubidium containing reactant rubidium chloride, instead of cesium chloride used to prepare sample C. The final composition obtained is $RbCa_{0.96}Ce_{0.02}Na_{0.02}Cl_3$. FIG. 4. shows the emission spectrum of sample D under X-ray excitation having a peak energy of 60 keV.

Figure 5:
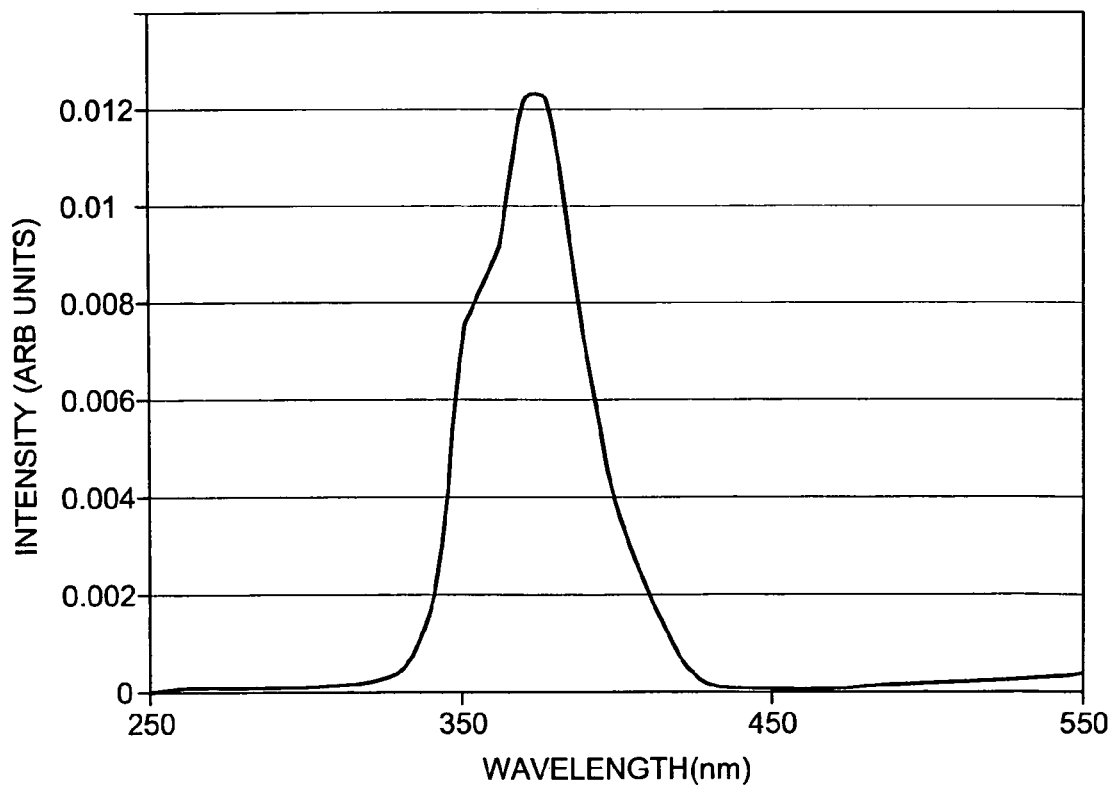

Sample E was another composition within the scope of the present invention. Sample E is cerium activated and charge compensated $RbSrCl_3$ ($RbSr_{0.96}Ce_{0.02}Na_{0.02}Cl_3$). The sample was prepared in the same manner as sample D, using a strontium containing reactant strontium chloride, instead of calcium chloride used to prepare sample D. The final composition obtained is $RbSr_{0.96}Ce_{0.02}Na_{0.02}Cl_3$. FIG. 5. shows the emission spectrum of sample E under X-ray excitation having a peak energy of 60 keV.

Figure 6:
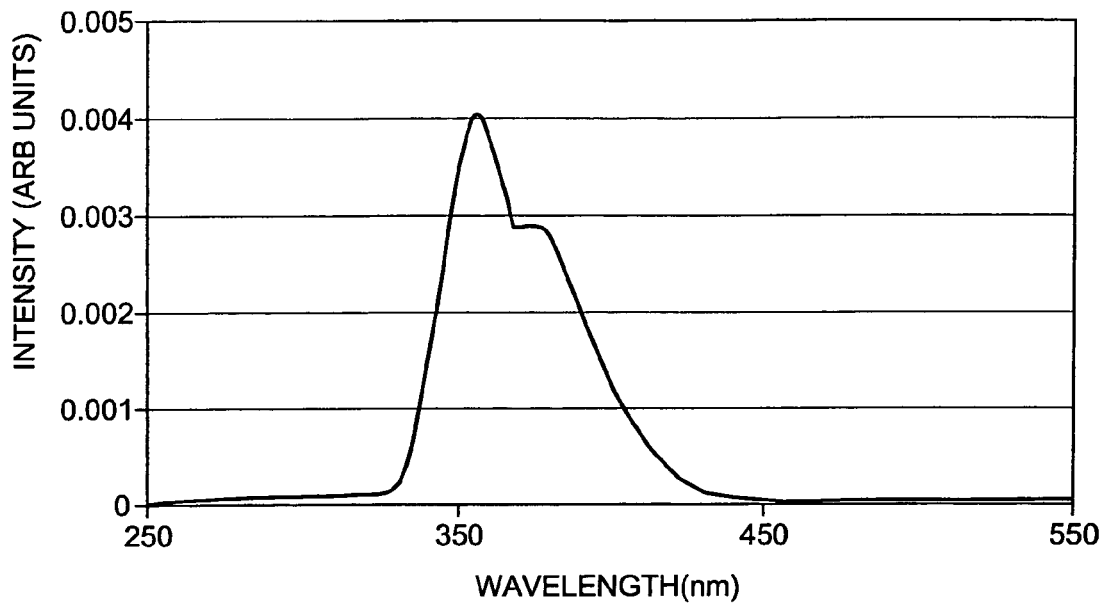

Sample F was a cerium-activated solid solution of $CsSrCl_3$ and $KCaCl_3$ ($(CsK)(SrCa_{0.98}Ce_{0.02})Cl_6$), which was a scintillator composition within the scope of the present invention. The composition was prepared by dry mixing cerium chloride with calcium chloride, cesium chloride, potassium chloride and strontium chloride. The volatility of the alkali halides at high temperatures requires a slight excess of these starting materials in the initial blend to compensate for their volatility. Mixing was carried out in an agate mortar and pestle. Since the starting materials are hygroscopic, mixing is carried out in inert atmosphere (glove box) to avoid exposure to air. The uniform mixture is transferred into a silver tube and sealed. The sample is then fired at a temperature of about 700° C. and for about 7 hours. The heating atmosphere was nitrogen. Alternately, the samples can be fired in covered alumina crucibles under a slightly reducing atmosphere. The final composition obtained was $(CsK)(SrCa_{0.98}Ce_{0.02})Cl_6$. Starting material levels are adjusted to maintain the final molar ratio. FIG. 6. shows the emission spectrum of sample F under X-ray excitation having a peak energy of 60 keV.

Figure 7:
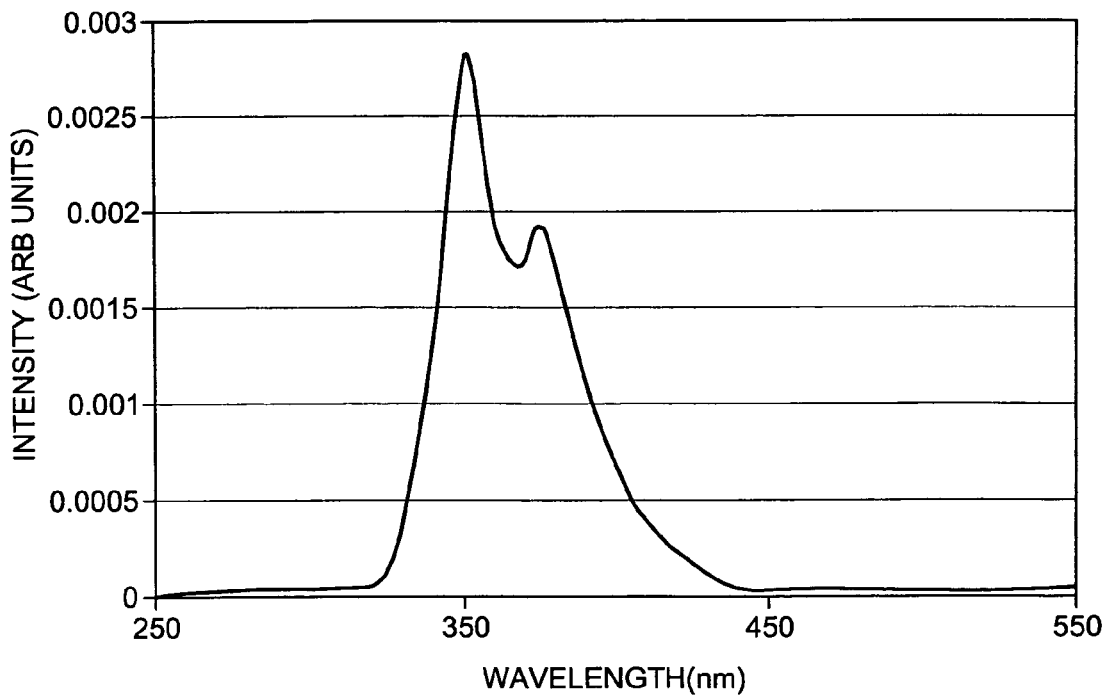

Sample G was a cerium-activated and charge compensated solid solution $(CsK)(SrCa_{0.96}Ce_{0.02}Na_{0.02})Cl_6$, which was a scintillator composition within the scope of the present invention. The composition was prepared by dry mixing cerium chloride with calcium chloride, cesium chloride, potassium chloride strontium chloride and sodium chloride. The volatility of the alkali halides at high temperatures requires a slight excess of these starting materials in the initial blend to compensate for their volatility. Mixing was carried out in an agate mortar and pestle. Since the starting materials are hygroscopic, mixing is carried out in inert atmosphere (glove box) to avoid exposure to air. The uniform mixture is transferred into a silver tube and sealed. The sample is then fired at a temperature of about 700° C. and for about 7 hours. The heating atmosphere was nitrogen. Alternately, the samples can be fired in covered alumina crucibles under a slightly reducing atmosphere. The final composition obtained was $(CsK)(SrCa_{0.96}Ce_{0.02}Na_{0.02})Cl_6$. Starting material levels are adjusted to maintain the final molar ratio. FIG. 7. shows the emission spectrum of sample G under X-ray excitation having a peak energy of 60 keV.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A scintillator composition, comprising the following, and any reaction products thereof:
    (a) an $ABX_3$ type halide perovskite material, wherein,
    A is cesium, rubidium, potassium, or sodium;
    B is calcium, strontium, barium, magnesium, cadmium or zinc; and
    X is bromine or iodine, when B is calcium, strontium, barium, or magnesium, and
    X is fluorine, chlorine, bromine or iodine, when B is cadmium or zinc; and
    (b) at least one activator for the perovskite material.

2. The scintillator composition of claim 1, wherein the at least one activator is at least one of trivalent cerium ions and trivalent praseodymium ions.

3. The scintillator composition of claim 1, wherein the at least one activator is present at a level in the range of about 0.1 mole % to about 20 mole %, based on total moles of activator and halide perovskite material.

4. The scintillator composition of claim 3, wherein the at least one activator is present at a level in the range of about 1 mole % to about 10 mole %.

5. The scintillator composition of claim 1, in substantially monocrystalline form.

6. The scintillator composition of claim 1, in polycrystalline form.

7. The scintillator composition of claim 1, in the form of a polycrystalline ceramic material.

8. The scintillator composition of claim 1, in the form of a film.

9. A scintillator composition, comprising the following, and any reaction products thereof:
    (a) an $ABX_3$ type halide perovskite material, wherein,
    A is cesium, rubidium, potassium, or sodium;
    B is calcium, strontium, barium, magnesium, cadmium or zinc;
    X is fluorine, chlorine, bromine or iodine;
    (b) a least one activator for the perovskite material;
    (c) at least one charge compensator to assist the incorporation of the at least one activator in the perovskite lattice.

10. The scintillator composition of claim 9, wherein the at least one activator comprises at least one of trivalent cerium ions and trivalent praseodymium ions.

11. The scintillator composition of claim 9, wherein the at least one activator is present at a level in the range of about 0.1 mole % to about 20 mole %, based on total moles of activator, charge compensator and halide perovskite material.

12. The scintillator composition of claim 11, wherein the at least one activator is present at a level in the range of about 1 mole % to about 10 mole %.

13. The scintillator composition of claim 9, wherein the at least one charge compensator is at least one of sodium or lithium ions.

14. The scintillator composition of claim 9, wherein the at least one charge compensator is present at a level comparable to the level of the at least one activator.

15. The scintillator composition of claim 9, in substantially monocrystalline form.

16. The scintillator composition of claim 9, in polycrystalline form.

17. The scintillator composition of claim 9, in the form of a polycrystalline ceramic material.

18. The scintillator composition of claim 9, in the form of a film.

19. A scintillator composition, comprising the following, and any reaction products thereof:
    (a) A perovskite matrix material comprising a solid solution of at least two $ABX_3$ type halide perovskites; wherein,
    A is independently cesium, rubidium, potassium, or sodium;
    B is independently calcium, strontium, barium, magnesium, cadmium or zinc;
    X is independently fluorine, chlorine, bromine or iodine;
    (b) at least one activator for the matrix material; and optionally
    (c) at least one charge compensator to assist the incorporation of the at least one activator in the perovskite lattice.

20. The scintillator composition of claim 19, wherein the at least one activator comprises at least one of trivalent cerium or praseodymium ions.

21. The scintillator composition of claim 19, wherein the perovskite matrix material comprises a solid solution of a first halide perovskite and a second halide perovskite, and wherein the molar ratio of the first halide to second halide is in the range of about 1:99 to about 99:1.

22. The scintillator composition of claim 21, wherein the molar ratio of the first halide to second halide is in the range of about 10:90 to about 90:10.

23. The scintillator composition of claim 22, wherein the molar ratio of the first halide to second halide is in the range of about 30:70 to about 70:30.

24. The scintillator composition of claim 19, wherein the at least one activator is present at a level in the range of about 0.1 mole % to about 20 mole %, based on total moles of activator and halide perovskite matrix material and charge compensator, if present.

25. The scintillator composition of claim 24, wherein the at least one activator is present at a level in the range of about 1 mole % to about 10 mole %.

26. The scintillator composition of claim 19, wherein the at least charge compensator is at least one of monovalent sodium or lithium ions.

27. The scintillator composition of claim 19, wherein the at least charge compensator is present at a level comparable to the level of the at least one activator.

28. The scintillator composition of claim 19, in substantially monocrystalline form.

29. The scintillator composition of claim 19, in polycrystalline form.

30. The scintillator composition of claim 19, in the form of a polycrystalline ceramic material.

31. The scintillator composition of claim 19, in the form of a film.

32. A radiation detector for high-energy radiation, comprising:
(A) a crystal scintillator comprising the following composition, and any reaction products thereof:
   (a) a halide perovskite, or a solid solution of two or more halide perovskites;
   (b) at least one activator for the perovskite material, comprising at least one of trivalent cerium or trivalent praseodymium ions; and optionally
   (c) at least one charge compensator to assist the incorporation of the at least one activator in the perovskite lattice, comprising at least one of monovalent sodium or lithium ions; and
(B) a photodetector optically coupled to the scintillator, so as to be capable of producing an electrical signal in response to the emission of a light pulse produced by the scintillator.

33. The radiation detector of claim 32, wherein the photodetector is at least one device selected from the group consisting of a photomultiplier tube, a photodiode, a CCD sensor, and an image intensifier.

34. The radiation detector of claim 33, operably connected to a well-logging tool.

35. The radiation detector of claim 33, operably connected to a nuclear medicine apparatus.

36. The radiation detector of claim 35, wherein the nuclear medicine apparatus comprises a positron emission tomography (PET) device.

37. The radiation detector of claim 35, operably connected to a digital imaging device.

38. The radiation detector of claim 35, operably connected to a screen scintillator.

39. A method for detecting high-energy radiation with a scintillation detector, comprising the steps of:
(A) receiving radiation by an activated, halide-perovskite-based scintillator crystal, so as to produce photons which are characteristic of the radiation; and
(B) detecting the photons with a photon detector coupled to the scintillator crystal;
   wherein the scintillator crystal is formed of a composition comprising the following, and any reaction products thereof:
   (a) a halide perovskite, or a solid solution of two or more halide perovskites;
   (b) at least one activator for the perovskite material, comprising at least one of trivalent cerium or trivalent praseodymium ions; and optionally
   (c) at least one charge compensator to assist the incorporation of the at least one activator in the perovskite lattice, comprising at least one of monovalent sodium or lithium ions.

40. A method for producing an activated, halide-perovskite based scintillator crystal which comprises:
   (a) an $ABX_3$ halide perovskite material, or a solid solution of two or more $ABX_3$ halide perovskites;
   (b) at least one activator for the material, comprising at least one of trivalent cerium or trivalent praseodymium ions; and optionally;
   (c) at least one charge compensator to assist the incorporation of the at least one activator in the perovskite lattice, comprising at least one of monovalent sodium or lithium ion.
said method comprising the following steps:
   (i) supplying at least one component A containing reactant, at least one component B containing reactant, at least one component X containing reactant; and at least one activator-containing reactant; and optionally at least one charge compensator containing reactant, according to proportions which satisfy the stoichiometric requirements for the scintillator crystal;
   (ii) melting the reactants at a temperature sufficient to form a molten composition; and
   (iii) crystallizing a crystal from the molten composition.

41. The method of claim 40, wherein the reactants are melted at a temperature in the range of about 650° C. to about 1050° C.

42. The method of claim 40, wherein step (iii) is carried out by a technique selected from the group consisting of the Bridgman-Stockbarger method; the Czochralski method, the zone-melting method, the floating zone method, and the temperature gradient method.

* * * * *